US012587007B2

(12) United States Patent
Lidström et al.

(10) Patent No.: US 12,587,007 B2
(45) Date of Patent: Mar. 24, 2026

(54) METHOD FOR CONTROLLING AN OVERCURRENT FUSE OF A BATTERY PACK IN AN ENERGY STORAGE SYSTEM OF A VEHICLE

(71) Applicant: VOLVO TRUCK CORPORATION, Gothenburg (SE)

(72) Inventors: Emil Lidström, Torslanda (SE); Diego Santos Pereira Netto, Askim (SE); Per Adelsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 141 days.

(21) Appl. No.: 18/537,484

(22) Filed: Dec. 12, 2023

(65) Prior Publication Data

US 2024/0204508 A1 Jun. 20, 2024

(30) Foreign Application Priority Data

Dec. 14, 2022 (EP) ..................................... 22213317

(51) Int. Cl.
| | |
|---|---|
| *H02H 7/18* | (2006.01) |
| *B60L 3/04* | (2006.01) |
| *B60L 58/18* | (2019.01) |

(52) U.S. Cl.
CPC ................. *H02H 7/18* (2013.01); *B60L 3/04* (2013.01); *B60L 58/18* (2019.02); *B60L 2240/549* (2013.01)

(58) Field of Classification Search
CPC ... H02H 7/18; B60L 3/04; B60L 58/18; B60L 2240/549; B60L 50/10; B60L 50/66;
(Continued)

(56) References Cited

U.S. PATENT DOCUMENTS

| | | | |
|---|---|---|---|
| 11,279,243 B1 | 3/2022 | Ashraf et al. | |
| 11,469,473 B1 | 10/2022 | Wiegman | |
| (Continued) | | | |

FOREIGN PATENT DOCUMENTS

| | | | | |
|---|---|---|---|---|
| DE | 102018200173 A1 | * | 7/2019 | ........... H01M 10/48 |
| JP | 2016082764 A | * | 5/2016 | |
| (Continued) | | | | |

OTHER PUBLICATIONS

Nomura H; Title: Device for interrupting electric power feeding path of battery for forklift, has switch control unit for switching off state when preset off time threshold value is shorter than overcurrent threshold value; entire specification and drawings (Year: 2016).*
(Continued)

*Primary Examiner* — Dharti H Patel
(74) *Attorney, Agent, or Firm* — Jeffri A. Kaminski; Venable LLP

(57) ABSTRACT

A computer system includes a processor device configured to determine battery current of each battery pack of a plurality of parallelly connected battery packs of an energy storage system of a vehicle, determine a system current for all of the plurality of parallelly connected battery packs in the energy storage system, compare the determined battery current with a predetermined battery pack overcurrent threshold for each one of the battery packs, and comparing the determined system current with a system overcurrent threshold, activate an overcurrent fuse of an associated battery pack in response to the determined battery current of the associated battery pack being higher than the battery pack overcurrent threshold, and to activate the overcurrent fuse of at least one of the same battery packs in response to the determined system current being higher than the system overcurrent threshold.

20 Claims, 4 Drawing Sheets

(58) Field of Classification Search

CPC ............. B60L 2200/18; B60L 2200/36; B60L 2200/40; B60L 3/12; B60L 58/21; B60L 3/0046; H01M 2010/4271; H01M 10/425; H01M 10/441; H01M 50/583; H01M 2200/103; H01M 2220/20; H02J 7/00304; H02J 7/0031; H02J 2310/48

USPC ......................................................... 361/93.1

See application file for complete search history.

(56) References Cited

U.S. PATENT DOCUMENTS

| | | | |
|---|---|---|---|
| 11,476,676 B1 | 10/2022 | Lohe et al. | |
| 11,532,933 B2 * | 12/2022 | Du ..................... | H02J 7/007192 |
| 11,784,500 B1 * | 10/2023 | Richter ................. | B64D 31/16 |
| | | | 361/1 |
| 12,308,787 B1 * | 5/2025 | Springs, Jr. ............. | H02S 20/32 |
| 2005/0280964 A1 * | 12/2005 | Richmond ................ | H02J 3/14 |
| | | | 361/62 |
| 2014/0021925 A1 * | 1/2014 | Asakura ............. | G01R 31/3648 |
| | | | 320/126 |
| 2022/0115878 A1 | 4/2022 | Khozikov et al. | |
| 2022/0169127 A1 | 6/2022 | Ashraf et al. | |
| 2022/0311257 A1 * | 9/2022 | Lai ........................ | H02J 7/0013 |
| 2023/0176135 A1 * | 6/2023 | Kim ................. | G01R 19/16542 |
| | | | 320/136 |
| 2023/0286388 A1 * | 9/2023 | Prasad .................... | B60L 58/15 |

FOREIGN PATENT DOCUMENTS

| | | | | | |
|---|---|---|---|---|---|
| JP | 2021163642 A | * | 10/2021 | | |
| KR | 20200042238 A | * | 4/2020 | ....... | G01R 19/16542 |
| WO | WO-2015040723 A1 | * | 3/2015 | ................ | H02J 7/04 |
| WO | WO-2018219701 A1 | * | 12/2018 | ................ | H02J 7/14 |
| WO | WO-2021200196 A1 | * | 10/2021 | ............. | B60L 53/66 |
| WO | WO-2025089929 A1 | * | 5/2025 | .......... | H01M 10/486 |

OTHER PUBLICATIONS

Extended European Search Report in corresponding European Application No. 22213317.5 dated Jun. 9, 2023 (24 pages).

* cited by examiner

METHOD FOR CONTROLLING AN OVERCURRENT FUSE OF A BATTERY PACK IN AN ENERGY STORAGE SYSTEM OF A VEHICLE

TECHNICAL FIELD

The disclosure relates generally to overcurrent management of battery packs in an energy storage system of a vehicle. In particular aspects, the disclosure relates to a computer implemented method for controlling an overcurrent fuse of a battery pack in an energy storage system of a vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which the vehicle is propelled both by an internal combustion engine and an electric machine. In either way, an energy storage device is used to store the energy needed in order to propel the vehicle. Energy storage devices may further be used to power auxiliary loads in the vehicle.

For many vehicles, the energy storage devices are comprised in an energy storage system, wherein the energy storage system is configured to power the electric machine for propelling the vehicle, as well as any auxiliary load. For example, for an electric vehicle, the energy storage devices may be batteries or battery packs, which are configured to operate the electric machine as well as electrically driven auxiliary equipment. The electric machine and/or the electrically driven auxiliary equipment may be commonly referred to as a load. Several batteries, or several series-connected and/or parallel connected battery cells, may be grouped into the battery pack. The battery pack is periodically in need of charging, and is then electrically connected to an electrical energy source, e.g. via plug directly connected to the power grid, or by an on-board charger. Such chargers may commonly be referred to as a power source.

In many applications, several battery packs are included in the energy storage system by being parallelly connected to a common traction voltage bus (or common traction power bus), sometimes referred to as multi-battery pack system. The load and/or power source is also connected to the common traction voltage bus. Hereby, the supplied power can be adapted based on the number of battery packs, and/or higher power requirements of the vehicle may be met. Typically, each battery pack is associated with a switch, or contactor, enabling connection and disconnection of the battery pack relative the common traction voltage bus and the load and/or power source.

The battery packs of the energy storage system may be equipped with overcurrent fuses. Typically, each battery pack comprises an overcurrent fuse which protects the battery pack from an overcurrent in the battery pack. The overcurrent fuses of the battery packs are also often adapted to be activated based on an overcurrent on a system level. Thus, the overcurrent threshold of the battery packs is set as a compromise between overcurrent on a battery pack level and overcurrent on a system level. This may lead to that the overcurrent fuses of the battery packs trigger too easily.

SUMMARY

According to a first aspect of the disclosure, computer system comprising a processor device is provided. The processor device is configured to:
  determine battery current of each battery pack of a plurality of parallelly connected battery packs of an energy storage system of a vehicle,
  determine a system current for all of the plurality of parallelly connected battery packs in the energy storage system,
  compare the determined battery current with a predetermined battery pack overcurrent threshold for each one of the battery packs, and comparing the determined system current with a system overcurrent threshold,
  activate an overcurrent fuse of an associated battery pack in response to the determined battery current of the associated battery pack being higher than the battery pack overcurrent threshold, and to activate the overcurrent fuse of the same battery pack in response to the determined system current being higher than the system overcurrent threshold.

The first aspect of the disclosure may seek to overcome problems relating to undesirable and unnecessary activation or triggering of overcurrent fuses, e.g. overcurrent fuses triggering too easily due to insufficient knowledge of the system current. A technical benefit may include improved, and adapted, activation of overcurrent fuses. By providing a processor device configured to activate the overcurrent fuse of a specific battery pack by battery pack overcurrent trigger (i.e. the determined battery current of the associated battery pack being higher than the battery pack overcurrent threshold) and by a system overcurrent trigger (i.e. the determined system current being higher than the system overcurrent threshold) allow for at least partly independent triggering on a battery pack-level and on a system level. That is, the overcurrent fuse may protect against overcurrent on the system level, without triggering too easily on the battery pack-level. The first aspect of the disclosure may provide efficient overcurrent management of the battery packs in an energy storage system.

A technical benefit of the first aspect of the disclosure, may include that the overcurrent fuses of a battery pack can be utilized in an advantageous manner. That is, as the activation of the overcurrent fuse of a specific battery pack is divided, and at least partly separated, between overcurrent on the battery pack-level and overcurrent on a system level, undesirable and unnecessary activation of the overcurrent fuses can be reduced, or even avoided. Thus, the battery packs of the energy storage system may be operated in a more robust manner.

According to a second aspect of the disclosure, a computer-implemented method is provided. The method comprises:
  determining, by a processor device of a computer system, battery current of each battery pack of a plurality of parallelly connected battery packs of an energy storage system,
  determining, by the processor device, a system current for all of the plurality of parallelly connected battery packs in the energy storage system of a vehicle,
  comparing, by the processor device, the determined battery current with a predetermined battery pack overcurrent threshold for each one of the battery packs, and comparing, by the processor device, the determined system current with a system overcurrent threshold, activating, by the processor device, an overcurrent fuse of an associated battery pack in response to the determined battery current of the associated battery pack being higher than the battery pack overcurrent threshold, and activating, by the processor device, the overcurrent fuse of the same battery pack in response to the determined system current being higher than the system overcurrent threshold.

The second aspect of the disclosure may seek to solve the same problem as described for the first aspect of the disclosure. Thus, effects and features of the second aspect of the disclosure are largely analogous to those described above in connection with the first aspect of the disclosure. Examples and embodiments mentioned in relation to the first aspect of the disclosure are largely compatible with the second aspect of the disclosure, and vice versa.

It should be understood that the plurality of parallelly connected battery packs of the energy storage system are the connected battery packs of the energy storage system. Each battery pack typically comprises a plurality of series-connected battery cells. The battery cells may be clustered into battery modules, wherein each battery pack comprises a plurality of series-connected battery modules. The energy storage system may comprise other, disconnected, battery packs. Such disconnected battery packs are typically not subject to the method of the present disclosure. However, the at least partly independent triggering on the battery pack-level and on the system level may be particularly advantageously when only one battery pack of the energy storage system is connected, or when at least one battery pack of the energy storage system is disconnected.

In some examples, the method further comprises receiving, by the processor device, measurement data from a plurality of sensors of the energy storage system, wherein the measurement data comprises battery current of each battery pack and the system current. A technical benefit may include usage of reliable data and efficient handling and communication of data. The plurality of sensors typically comprises at least one current sensor for each battery pack configured to measure the current of the associated battery pack. The plurality of sensors typically comprises at least one current sensor configured to measure the system current in the energy storage system. The plurality of sensors, or current sensors, may be current shunts.

In some examples, the method comprises determining, by the processor device, the plurality of parallelly connected battery packs as the battery packs of the energy storage system being connected to a common traction voltage bus of the energy storage system. A technical benefit may include efficient determination of the battery packs subject to the method of the disclosure. That is, the energy storage system may comprise a common traction voltage bus and a plurality of parallelly arranged battery packs connected to the common traction voltage bus. The energy storage system may further comprise a switching arrangement including at least one associated contactor for each battery pack, the contactors being configured to connect the battery packs to the common traction voltage bus by closing, and to disconnect the battery packs from the common traction voltage bus by opening. Hereby, certain battery packs can be disconnected from the common traction voltage bus. Such disconnected battery packs are not subject to the method of the disclosure.

In some examples, the method comprises using, by the processor device, a determined current of the common traction voltage bus as the system current. A technical benefit may include efficient determination of the system current. For example, a sensor of the previously described plurality of sensors, may be arranged to measure the current of the common traction voltage bus and provide measurement data of the system current.

In some examples, the battery pack overcurrent threshold is independently set with regards to the current of the common traction voltage bus. A technical benefit may include independent triggering of the overcurrent fuse on a battery pack-level. That is, the overcurrent fuse may satisfyingly protect against overcurrent on the battery pack-level, while still being able to trigger satisfyingly on the system level. Thus, the method of the disclosure is advantageous and may provide for a satisfying overcurrent protection regardless of if only one, or several, of the battery packs of the energy storage system is connected to the common traction voltage bus. In some examples, the battery pack overcurrent threshold is determined independently of the system overcurrent threshold.

In some examples, the method comprises determining, by the processor device, a plurality of loads electrically coupled to the common traction voltage bus, and using, by the processor device, a determined current of any one of the common traction voltage bus and the plurality of loads as the system current. A technical benefit may include improved determination of the system current, and improved management of activation of the overcurrent fuses of the battery packs. As the plurality of parallelly connected battery packs is connected to the common traction voltage bus, the common traction voltage bus being electrically coupled to a plurality of loads (e.g. for powering the loads), the system current may be defined as the current of any one of the connected loads, or as the current of the common traction voltage bus. For example, a sensor of the previously described plurality of sensors, may be arranged to measure the current of any one of the connected loads, or the current of the common traction voltage bus, and provide measurement data of such measured current.

In some examples, the system overcurrent threshold is at least twice the battery pack overcurrent threshold, and at most four times the battery pack overcurrent threshold. A technical benefit may include efficient distinguishing battery pack overcurrent threshold and the system overcurrent threshold. Hereby, the overcurrent fuse may protect against overcurrent on the system level, without triggering too easily on the battery pack-level. For example, the system overcurrent threshold is set to 4000 A, and the battery pack overcurrent threshold is set to 1200 A (instead of 500 A in an example of eight parallelly connected battery packs, each having a single overcurrent threshold adapted for both battery pack-level and system level).

In some examples, the system overcurrent threshold and the battery pack overcurrent threshold are in the unit ampere (A), or ampere over predetermined time period (e.g. 4000 A over a time period of 100 ms).

In some examples, the overcurrent fuse is a pyro-fuse or a semiconductor fuse. A technical benefit may include reliable and efficient overcurrent fuses.

In some examples, the method comprises activating, by the processor device, the overcurrent fuse of each one of the battery packs in response to the determined system current being higher than the system overcurrent threshold. A technical benefit may include efficient overcurrent protection on a system level. Thus, in the event of detecting an overcurrent on the system level (i.e. the determined system current being higher than the system overcurrent threshold), the overcurrent fuses of all of the battery packs (typically connected to the common traction voltage bus) are activated. It should be understood that the overcurrent fuse of a battery pack is configured to deactivate the battery pack, if the overcurrent fuse is activated. In other words, the battery pack will, upon activation of the associated overcurrent fuse, be disconnected from common traction voltage bus. Thus any current flow through the battery cells of the battery pack to the common traction voltage bus will be stopped. The overcurrent fuse may be referred to as an overcurrent protection device, or overcurrent protection unit.

In some examples, the method comprises identifying, by the processor device, a battery pack condition as being a predefined overcurrent battery pack condition defined by that the determined battery current of at least one battery pack is higher than the battery pack overcurrent threshold, and activating the overcurrent fuse of the associated battery pack in response to identifying such overcurrent battery pack condition, and identifying, by the processor device, a system condition as being a predefined overcurrent system condition defined by that the determined system current is higher than the system overcurrent threshold, and activating the overcurrent fuse of the same battery pack, or of all battery packs, in response to identifying such overcurrent battery pack condition.

According to a third aspect of the disclosure, an energy storage system of a vehicle is provided. The energy storage system comprises a plurality of parallelly arranged battery packs connectable to a common traction voltage bus, and an associated overcurrent fuse for each battery pack, the overcurrent fuses being configured to protect the battery packs with regards to an overcurrent, the energy storage system further comprising a control circuitry configured to:

determine battery current of each battery pack connected to the common traction voltage bus, determine a system current for all battery packs connected to the common traction voltage bus, compare the determined battery current with a predetermined battery pack overcurrent threshold for each one of the battery packs, and compare the determined system current with a system overcurrent threshold, activate the overcurrent fuse of an associated battery pack in response to the determined battery current of the associated battery pack being higher than the battery pack overcurrent threshold, and activate the overcurrent fuse of the same battery pack in response to the determined system current being higher than the system overcurrent threshold.

The third aspect of the disclosure may seek to solve the same problem as described for the first and second aspects of the disclosure. Thus, effects and features of the third aspect of the disclosure are largely analogous to those described above in connection with the first and second aspects of the disclosure. Examples and embodiments mentioned in relation to the first and second aspects of the disclosure are largely compatible with the third aspect of the disclosure, and vice versa.

In some example, the energy storage system comprises a plurality of sensors configured to provide measurements of battery current of each battery pack and the system current. A technical benefit may include usage of reliable current measurement and efficient handling and communication of such measurement. For example, the control circuitry may be configured to receive such measurements of the battery current and the system current, e.g. as an analog signal, or as measurement data in a digital signal. In examples, each overcurrent fuse of the battery packs is coupled to the corresponding sensor of the battery pack, and at least one sensor for measuring the system current. The plurality of sensors may be comprised in the control circuitry.

In some examples, the plurality of sensors is a plurality of current shunts. A technical benefit may include reliable current measurement and low complexity of the energy storage system and/or of the control circuitry. The current shunt of the disclosure may be an ammeter or amp-meter shunt comprising a separate shunt, a resistor of very low but accurately known resistance, e.g. arranged in parallel with a voltmeter (or voltage sensor or analog/digital converter, ADC), such that all, or substantially all, of the current to be measured flows through the shunt. The resistance is chosen so that the resultant voltage drop is measurable but low enough not to disrupt the control circuit. The voltage across the shunt is typically proportional to the current flowing through it. In some examples, the plurality of sensors is a plurality of hall sensors, e.g. analog or digital hall sensors. Thus, the plurality of sensors may comprise at least one current shunt, at least one hall sensor, or comprise at least one current shunt and at least one hall sensor.

In some examples, energy storage system comprises a plurality of battery pack overcurrent comparators configured to compare the determined battery current with a predetermined battery pack overcurrent threshold for each one of the battery packs, and one or more system overcurrent comparators configured to compare the determined system current with a system overcurrent threshold, wherein the overcurrent fuse of each one of the battery packs is directly connected to one of the plurality of battery pack overcurrent comparators, and at least one system overcurrent comparator for corresponding activation of the overcurrent fuse. A technical benefit may include reliable comparison of the current measurements with corresponding overcurrent thresholds. The plurality of battery pack overcurrent comparators and the one or more system overcurrent comparators may be comprised in the control circuitry.

In some examples, the battery pack overcurrent comparators are battery pack analogue comparators, and/or the one or more system overcurrent comparators are one or more system analogue comparators. A technical benefit may include reliable comparison of the current measurements with corresponding overcurrent thresholds, and low complexity of the energy storage system and/or of the control circuitry.

In some examples, the plurality of sensors, the plurality of overcurrent comparators and the one or more system overcurrent comparators are comprised in the control circuitry. A technical benefit may include improve functionality of the control circuitry.

Stated differently, and in some examples, each one of the battery packs in the energy storage system comprises a corresponding current shunt for measuring the battery current (i.e. battery current shunt), and a first analogue comparator coupled to the current shunt. The first analogue comparator of a battery pack is coupled to the overcurrent fuse of the same battery pack, and is configured to activate the overcurrent fuse in response to the measured battery current (by the current shunt) is higher than the predetermined battery pack overcurrent threshold (included in the first analogue comparator). Additionally, the energy storage system may comprise a current shut for measuring the system current (i.e. system current shunt e.g. at the common traction voltage bus, and/or at one or more of loads electrically coupled by the common traction voltage bus), and one or more second analogue comparator. For example, the energy storage system may comprise a central second analogue comparator, or each one of the battery packs may comprise a second analogue comparator. The central second analogue comparator is coupled to the overcurrent fuses of each one of the battery packs, or the second analogue comparator of each battery pack is coupled to the overcurrent fuse of the corresponding battery pack, and is configured to activate the overcurrent fuse in response to the measured system current (by the current shunt) is higher than the predetermined system overcurrent threshold (included in the second analogue comparator).

According to a fourth aspect of the disclosure, a vehicle comprising the processor to perform the method of the second aspect of the disclosure, or comprising the energy storage system of the third aspect of the disclosure, is provided. The processor may e.g. be that of the first aspect of the disclosure.

According to a fifth aspect of the disclosure, a computer program product comprising program code for performing, when executed by the processor device, the method of the second aspect of the disclosure is provided.

According to a sixth aspect of the disclosure, a control system comprising one or more control units configured to perform the method of the second aspect of the disclosure is provided.

According to a seventh aspect of the disclosure, a non-transitory computer-readable storage medium comprising instructions, which when executed by the processor device, cause the processor device to perform the method of the second aspect of the disclosure is provided.

The fourth to seventh aspects of the disclosure may seek to solve the same problem as described for the first to third aspects of the disclosure. Thus, effects and features of the fourth to seventh aspects of the disclosure are largely analogous to those described above in connection with the first to third aspects of the disclosure.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

DETAILED DESCRIPTION

Aspects set forth below represent the necessary information to enable those skilled in the art to practice the disclosure. The object of the present inventive concept is to solve the problem relating to undesirable and unnecessary activation or triggering of overcurrent fuses of battery packs in an energy storage system of a vehicle, e.g. overcurrent fuses triggering too easily due to insufficient knowledge of the system current, and to provide an improved control of overcurrent fuses of the battery packs. The inventive concept solves the problem by, inter alia, activating an overcurrent fuse of an associated battery pack in response to the determined battery current of the associated battery pack being higher than a battery pack overcurrent threshold, and by activating the overcurrent fuse of the same battery pack in response to the determined system current being higher than the system overcurrent threshold. By activating the overcurrent fuse of a specific battery pack by both a battery pack overcurrent trigger and a system overcurrent trigger, at least partly independent overcurrent fuse triggering on a battery pack-level and on a system level is provided.

Figure 1:
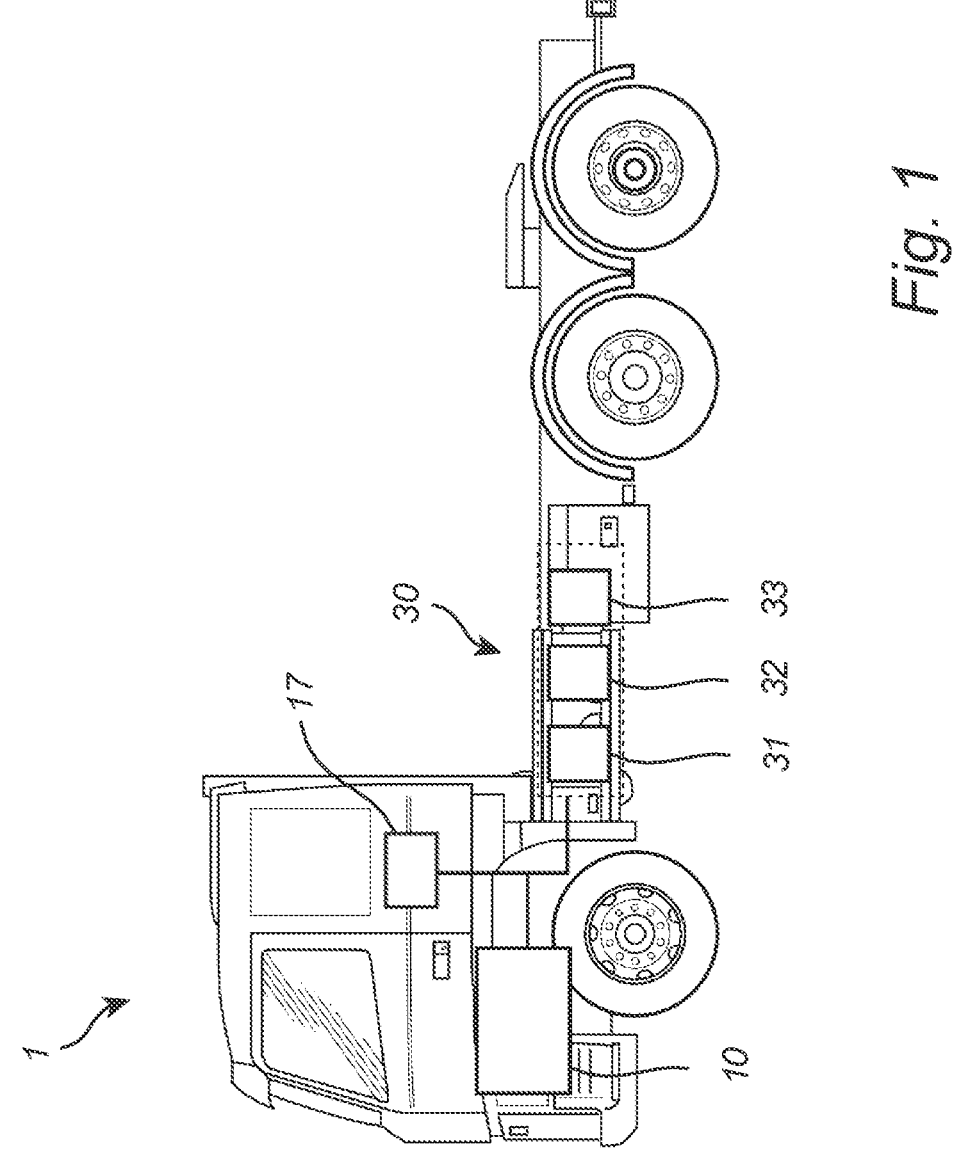
FIG. 1 is an exemplary, partly schematic, side view of an electric vehicle comprising an energy storage system having a plurality of parallelly arranged battery packs, and a control unit according to one example.

FIG. 1 shows an exemplary heavy duty truck 1. The truck 1 is an electric vehicle, such as a full electric vehicle or a hybrid, comprising at least one electric machine 10 powered by an energy storage system 30, wherein in the example of FIG. 1, the energy storage system 30 comprises three parallelly connected battery packs 31, 32, 33. The battery packs 31, 32, 33 are configured to power at least one load, such as the electric machine 10. Moreover, the energy storage system 30 comprises a control unit 17 (or control circuitry) arranged and configured for controlling at least parts of the operation of the energy storage system 30. The vehicle 1 typically further comprises other parts of the powertrain such as transmission, drive shafts and wheels (not shown in detail). The electric machine 10 may be operated as an electric motor consuming electricity provided by the battery packs 31, 32, 33, e.g. to provide propulsion power, and may be operated as a generator to generate electricity to charge the battery packs 31, 32, 33. Each one of the battery packs 31, 32, 33 comprises an associated overcurrent fuse (exemplified in FIG. 2), the overcurrent fuses being configured to protect the battery packs with regards to an overcurrent.

Figure 2:
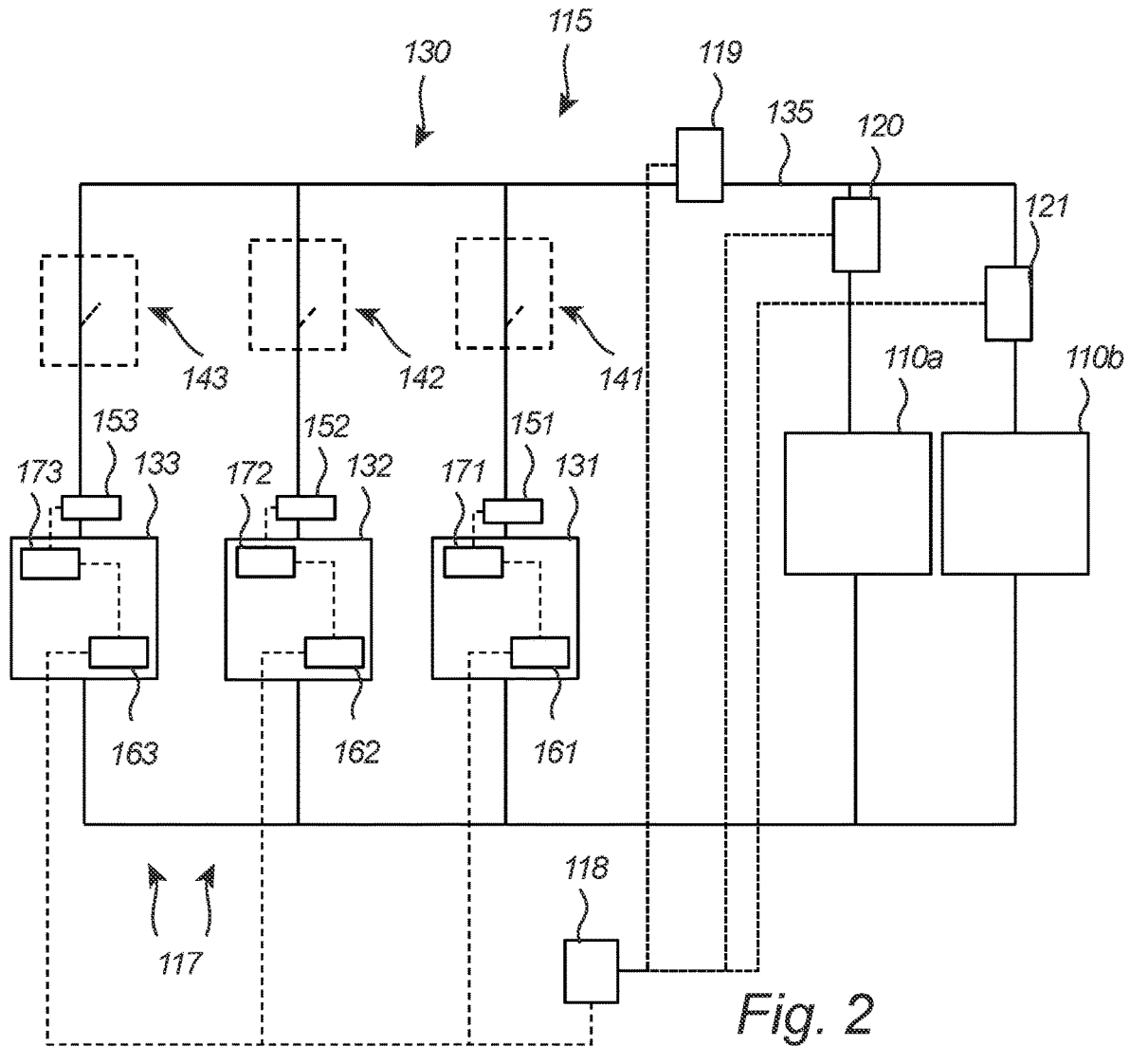
FIG. 2 is a schematic view of an energy storage system of a vehicle, the energy storage system having a plurality of parallelly arranged battery packs and a control circuitry according to one example.

FIG. 2 is a schematic view of an energy storage system 130 having a plurality of parallelly connected battery packs 131, 132, 133, and a control circuitry 117. The example shown in FIG. 2 may be implemented in the truck 1 of FIG. 1. The energy storage system 130 comprises a plurality of overcurrent fuses 161, 162, 163, configured to deactivate the battery packs 131, 132, 133 (e.g. to disrupt, disconnect, cut or burn an internal circuit of each one of the battery packs 131, 132, 133). The overcurrent fuses 161, 162, 163 may e.g. be pyro-fuses or semiconductor fuses. Thus, the overcurrent fuses 161, 162, 163 are configured to protect the battery packs 131, 132, 133 with regards to an overcurrent. Moreover, the plurality of battery packs 131, 132, 133 is arranged in parallel for connection to common traction voltage bus 135 and powering of a plurality of loads 110a, 110b (e.g. one of the loads 110b being an electric machine, e.g. as electric machine 10 of FIG. 1). The energy storage system 130 of FIG. 1 comprises a switching arrangement 115 configured to connect and disconnect the battery packs 131, 132, 133 to and from the common traction voltage bus 135 by closing and opening, respectively. The common traction voltage bus 135 may in some examples be comprised in a junction box.

In more detail, the energy storage system 130 comprises a first battery pack 131, a second battery pack 132 and a third battery pack 133, but it should be noted that any number of battery packs equal to, or higher than, two may be included in the energy storage system 130. The switching arrangement 115 comprises an associated contactor 141, 142, 143 for each battery pack 131, 132, 133. Thus, the switching arrangement 115 comprises a first contactor 141 configured to connect and disconnect the first battery pack 131 to and from to the common traction voltage bus 135 by closing and opening, respectively, and comprises a second contactor 142 configured to connect and disconnect the second battery pack 132 to and from the common traction voltage bus 135 by closing and opening, respectively, and comprising a third contactor 143 configured to connect and disconnect the third battery pack 133 to and from the common traction voltage bus 135 by closing and opening, respectively. Thus, an associated contactor, here being the first, second and third contactors 141, 142, 143, is provided for each battery pack, here being the corresponding first, second and third battery packs 131, 132, 133. The plurality of loads 110*a*, 110*b* may be powered by all, or any one, of the first, second and third battery packs 131, 132, 133 by closing the corresponding first, second and third contactors 141, 142, 143 (i.e. by connecting the first, second and third battery packs 131, 132, 133 to the common traction voltage bus 135).

Any one of, or all of, the first, second and third battery packs 131, 132, 133 may be disconnected from the common traction power bus 135 by opening the corresponding first, second and third contactors 141, 142, 143. The switching arrangement 115 may comprises a control unit (not shown in FIG. 2) configured to control the operation of at least the switching arrangement 115. The switching arrangement 115 is, via the control unit, configured to disconnect the first, second and third battery packs 131, 132, 133 from the common traction voltage bus by means of the first, second and third contactors 141, 142, 143, respectively. The switching arrangement 115 may comprise additional contactors (e.g. pre-charge contactors, secondary contactors) for one or more of the battery packs 131, 132, 133.

In a first state being a fully connected state, each one of the first, second and third contactors 141, 142, 143 are closed and each one of the first, second and third battery packs 131, 132, 133 are connected to the common traction voltage bus 135 for powering the plurality of loads 110*a*, 110*b*, as shown in FIG. 2. In a second state, being a disconnection state, one, two, or all three of the first, second and third contactors 141, 142, 143 are opened to disconnect the corresponding first, second and/or third battery pack 131, 132, 133 from the common traction voltage bus 135 (shown by the dashed connector in each one of the first, second and third contactors 141, 142, 143).

In the example of FIG. 2, the overcurrent fuses 161, 162, 163 of the energy storage system 130 comprises a first overcurrent fuse 161 comprised in the first battery pack 131, a second overcurrent fuse 162 comprised in the second battery pack 132 and a third overcurrent fuse 163 comprised in the third battery pack 133. Moreover, the energy storage system 130 comprises a first current sensor 151 configured to measure the battery current of the first battery pack 131, a second current sensor 152 configured to measure the battery current of the second battery pack 132, and a third current sensor 153 configured to measure the battery current of the third battery pack 133. Each one of the first, second and third current sensors 151, 152, 153 may be a corresponding current shunt, or ammeter shunt. The first, second and third current sensors 151, 152, 153 are configured to determine battery current of each battery pack 131, 132, 133 connected to the common traction voltage bus 135.

The energy storage system 130 of FIG. 2 comprises a fourth current sensor 119 configured to measure the system current of the common traction voltage bus 135. Additionally, or as an alternative, the energy storage system 130 may comprise a fifth current sensor 120 and/or a sixth current sensor 121. The fifth current sensor 120 is configured to measure the system current of the first load 110*a*, and the sixth current sensor 121 is configured to measure the system current of the second load 110*b*. The fourth, fifth and sixth current sensors 119, 120, 121 are configured to determine system current of various positions in the energy storage system 130. A system current may here be defined as a current in the energy storage system for which all battery packs 131, 132, 133 connected to the common traction voltage bus 135 contributes to. Thus, the current of the common traction voltage bus 135, as well as the current of any one of the loads 110*a*, 110*b*, may be defined as a system current for which all battery packs connected to the common traction voltage bus 135 contribute to. Each one of the fourth, fifth and sixth current sensors 119, 120, 121 may be a corresponding current shunt, or ammeter shunt.

The energy storage system 130 of FIG. 2 comprises a plurality of battery pack overcurrent comparators 171, 172, 173 configured to compare the measured or determined battery current of the first, second and third currents sensors 151, 152, 153 with a respective predetermined battery pack overcurrent threshold. In more detail, a first battery pack overcurrent comparator 171 is comprised in the first battery pack 131, a second battery pack overcurrent comparator 172 is comprised in the second battery pack 132 and a third battery pack overcurrent comparator 173 is comprised in the third battery pack 133. Moreover, the energy storage system 130 comprises at least one system overcurrent comparator 118 configured to compare the determined system current with a system overcurrent threshold. Thus, the system overcurrent comparator 118 is coupled to at least one of the fourth, fifth and sixth current sensors 119, 120, 121. As an alternative, the energy storage system 130 comprises a separate system overcurrent comparator for each one of the fourth, fifth and sixth current sensors 119, 120, 121, or for any one of the fourth, fifth and sixth current sensors 119, 120, 121 comprised in the energy storage system 130.

The overcurrent fuses 161, 162, 163, the current sensors 119, 120, 121, 151, 152, 153 and/or the overcurrent comparators 118, 171, 172, 173 may form a part of the control circuitry 117, and/or may be operated by a processor device, such as the control unit 17 of FIG. 1.

For each one of the battery packs 131, 132, 133, the corresponding first, second and third overcurrent fuses 161, 162, 163 is directly connected to the associated battery pack overcurrent comparator 171, 172, 173 (i.e. the first overcurrent fuse 161 is directly coupled to the first battery pack overcurrent comparator 171, the second overcurrent fuse 162 is directly coupled to the second battery pack overcurrent comparator 172 and the third overcurrent fuse 163 is directly coupled to the third battery pack overcurrent comparator 173). Moreover, each one of the first, second and third overcurrent fuses 161, 162, 163 is directly connected to the system overcurrent comparator 118. The battery pack overcurrent comparators 171, 172, 173, and the system overcurrent comparator 118, are configured to activate the overcurrent fuses 161, 162, 163. Hereby, the first overcurrent fuse 161 may be activated by the first battery pack overcurrent comparator 171 and in response to that the determined battery current of the first battery pack 131 is higher than the battery pack overcurrent threshold. The first overcurrent fuse 161 may additionally be activated by the system overcurrent comparator 118 and in response to that the determined system current is higher than the system overcurrent threshold. Correspondingly, the second overcurrent fuse 162 may be activated by the second battery pack overcurrent comparator 172 and in response to that the determined battery current of the second battery pack 132 is higher than the battery pack overcurrent threshold. The second overcurrent fuse 162 may additionally be activated by the system overcurrent comparator 118 and in response to that the determined system current is higher than the system overcurrent threshold. Finally, the third overcurrent fuse 163 may be activated by the third battery pack overcurrent comparator 173 and in response to that the determined battery current of the third battery pack 133 is higher than the battery pack overcurrent threshold. The third overcurrent fuse 163 may additionally be activated by the system overcurrent comparator 118 and in response to that the determined system current is higher than the system over-current threshold. Hereby, as the activation of the overcur-rent fuse 161, 162, 163 of a specific battery pack 131, 132, 133 is divided, and at least partly separated, between over-current on the battery pack-level and overcurrent on a system level, undesirable and unnecessary activation of the overcurrent fuses 161, 162, 163 can be reduced, or even avoided. It should be noted that the battery pack overcurrent threshold for the first, second and third battery pack over-current comparator 171, 172, 173 may be different, or the same.

In some examples, each one of the first, second and third overcurrent comparators 171, 172, 173 are analogue com-parators. In some examples, the system overcurrent com-parator 118 is an analogue comparator.

Figure 3:
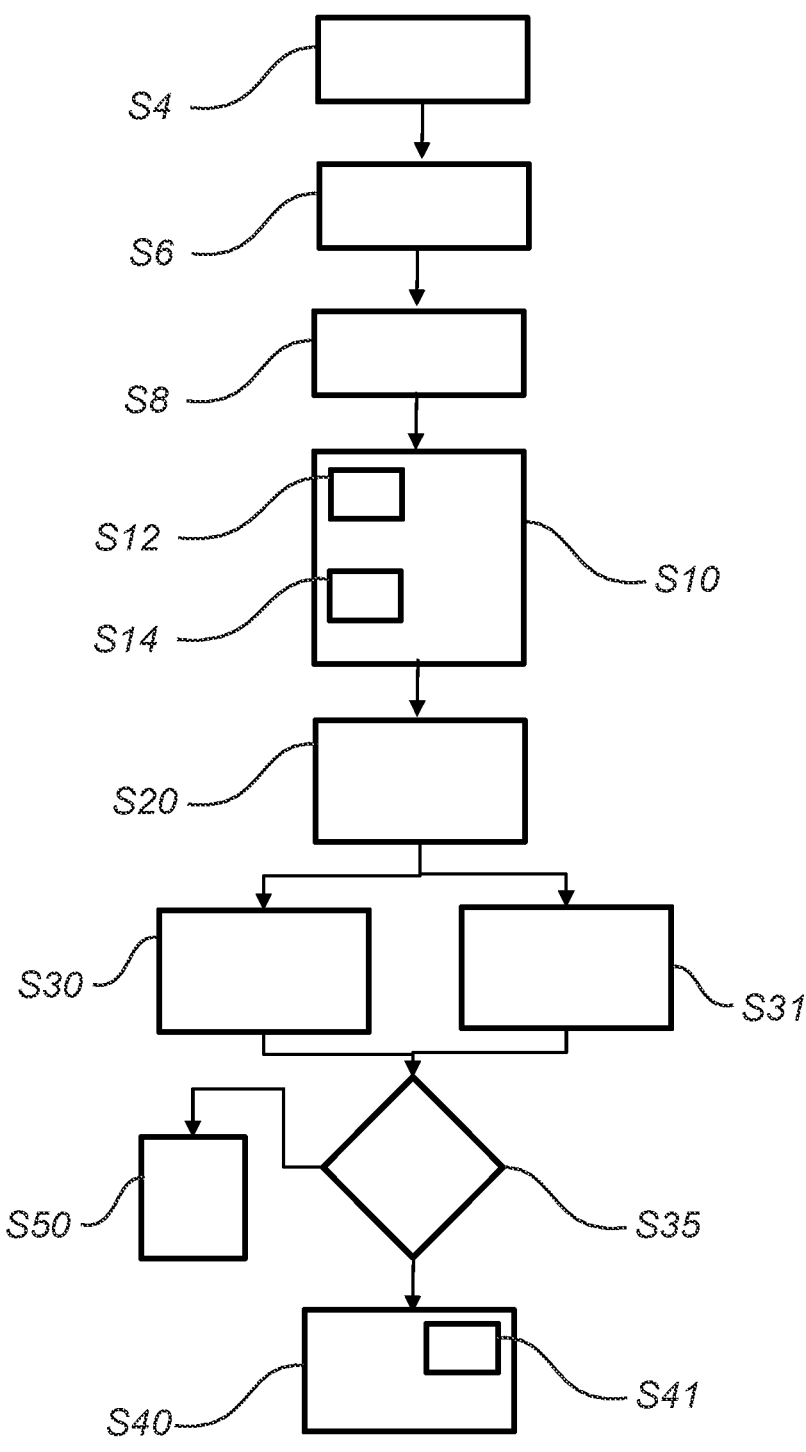
FIG. 3 is a flowchart illustrating the steps of a method according to one example.

FIG. 3 is a flow chart of a computer implemented method for controlling an overcurrent fuse of a battery pack in an energy storage system of a vehicle, the energy storage system comprises a plurality of parallelly arranged battery packs and an associated overcurrent fuse for each battery pack, such as the energy storage system 30 of FIG. 1, or energy storage system 130 of FIG. 2.

In a step S10, e.g. being a first step S10, battery current of each battery pack of a plurality of parallelly connected battery packs of an energy storage system of a vehicle is determined by a processor device of a computer system. For example, and with reference to FIG. 1, the processor device may be comprised in the control unit 17 of the truck 1.

In a step S20, e.g. being a second step S20, a system current for all of the plurality of parallelly connected battery packs in the energy storage system is determined by the processor device.

In a step S30, e.g. being a third step S30, the determined battery current is compared, by the processor device, with a predetermined battery pack overcurrent threshold for each one of the battery packs. In a step S31, e.g. being performed prior to, in parallel with, or subsequent to, the step S30, the determined system current is compared, by the processor device, with a system overcurrent threshold. In some examples, the system overcurrent threshold is at least twice the battery pack overcurrent threshold, and at most four times the battery pack overcurrent threshold.

In a step S40, e.g. being a fourth step S40, in response to the determined battery current of the associated battery pack being higher than the battery pack overcurrent threshold, an overcurrent fuse of an associated battery pack is activated by the processor device, and in response to the determined system current being higher than the system overcurrent threshold, the overcurrent fuse of the same battery pack is activated by the processor device. As previously described, the overcurrent fuses may be pyro-fuses or semiconductor fuses. In some examples, step S40 comprises the sub-step S41 of activating the overcurrent fuse of each one of the battery packs in response to the determined system current being higher than the system overcurrent threshold.

In the flow chart of FIG. 3, the two steps S30, S31 are shown together with a separated decision making step S35. Thus, depending on the outcome of the decision making step S35, the overcurrent fuse of at least one battery pack is activated, either in accordance with step S40 in response to step S30, or in accordance with step S40 in response to step S31, or no overcurrent fuse of a battery pack is activated, as shown as a step S50. The decision making step S35 may thus act in response to step S30, and continue to step S40 in response to that the determined battery current is higher than the predetermined battery pack overcurrent threshold for at least one battery pack. Additionally, the decision making step S35 may act in response to step S31, and continue to step S40 in response to that the determined system current is higher than the system overcurrent threshold.

In an optional step S8, e.g. carried out previously to step S10, measurement data from a plurality of sensors of the energy storage system is received by the processor device, and the received measurement data is used as the determined battery current of each battery pack and the system current of step S10.

In an optional step S4, e.g. carried out previously to step S10, the plurality of parallelly connected battery packs is determined by the processor device as the battery packs of the energy storage system being connected to a common traction voltage bus of the energy storage system. For examples, with reference to FIG. 2, the three battery packs 131, 132, 133 are connected to the common traction voltage bus 135. The battery packs connected to the common traction voltage bus are typically those used in step S10 of the method.

In an optional sub-step S12 to step S10, and in response to step S4, a determined current of the common traction voltage bus is used, by the processor device, as the system current. In some examples, the battery pack overcurrent threshold is independently set with regards to the current of the common traction voltage bus.

In an optional step S6, and in response to step S4, a plurality of loads electrically coupled to the common trac-tion voltage bus is determined by the processor device, and in an optional sub-step S14, in response to step S6, a determined current of any one of the common traction voltage bus and the plurality of loads is used, by the processor device, as the system current. It should be noted that the plurality of loads is powered by the common traction voltage bus, and the processor device determines, or iden-tifies, such loads.

The controlling apparatus 17 of FIG. 1 may be configured to perform the method as described with reference to FIG. 3. The method as described with reference to FIG. 3 may thus be implemented in a computer program product com-prising program code for performing, when executed by the processor device, the method described with reference to FIG. 3. Alternatively the method as described with reference to FIG. 3 may be implemented in a non-transitory computer-readable storage medium comprising instructions, which when executed by the processor device, cause the processor device to perform the method as described with reference to FIG. 3. Thus, the control unit 17 may comprise instructions to cause the energy storage system 30 to be operated according to at least some of the steps described with reference to FIG. 3. Moreover, the control circuitry 117 of FIG. 2 may be configured to perform the method as described with reference to FIG. 3, e.g. by means of a control unit 17 of FIG. 1. The control unit 17 may comprise the control circuitry 117, or at least part of the control circuitry 117. However, it should be noted that the method may also be implemented in the energy storage system 130 of FIG. 2 in which the overcurrent comparators 171, 172, 173, 118 are analogue comparators, and wherein the current sensors 119, 120, 121, 151, 152, 153, are current shunts. For such examples, there is no need to control the overcurrent fuses 161, 162, 163 of the battery packs 131, 132, 133 by a processor device, or a control unit, as the control circuitry, by the analogue comparators and the current shunts, automatically and by simple logic activates the overcurrent fuses in response to that the determined battery current of the associated battery pack is higher than the battery pack overcurrent threshold and in response to the determined system current is higher than the system overcurrent threshold.

The control unit 17 of the truck 1 of FIG. 1, and the control circuitry 117 of the energy storage system 130 of FIG. 2, may constitute, or be comprised in, a control system comprising one or more control units configured to perform the method as described with reference to FIG. 3. Such control system 1000 is now described with reference to FIG. 4.

Figure 4:
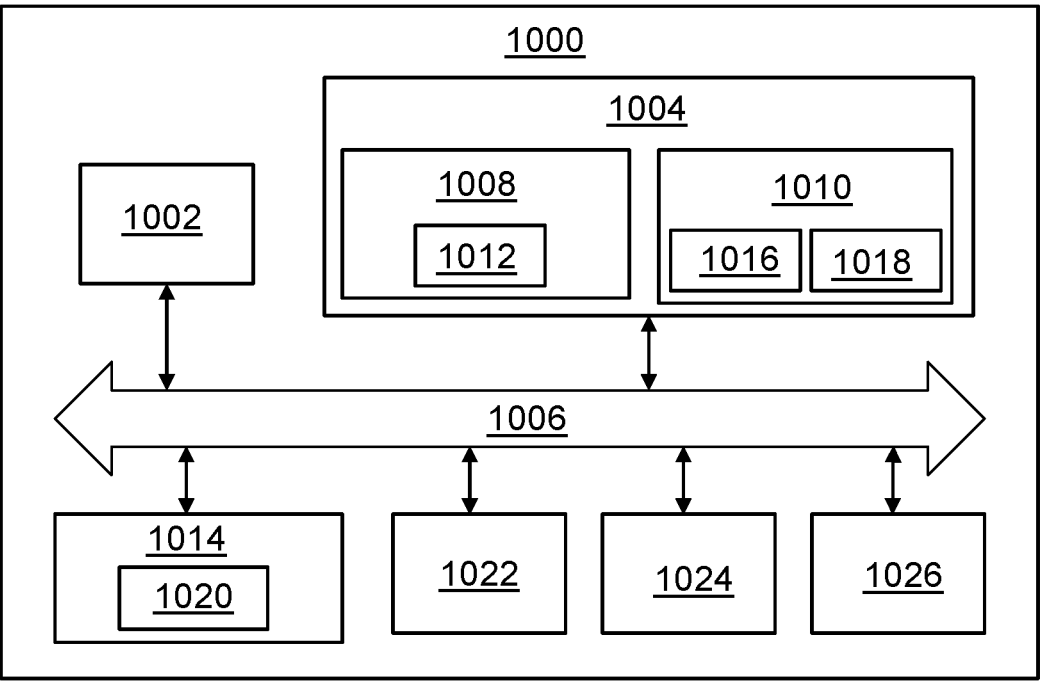
FIG. 4 is a schematic diagram of an exemplary computer system for implementing examples disclosed herein, according to one example.

FIG. 4 is a schematic diagram of a computer system 1000 for implementing examples disclosed herein, e.g. the method as described with reference to FIG. 3. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include a processor device 1002 (may also be referred to as a control unit), a memory 1004, and a system bus 1006. The computer system 1000 may include at least one computing device having the processor device 1002. The system bus 1006 provides an interface for system components including, but not limited to, the memory 1004 and the processor device 1002. The processor device 1002 may include any number of hardware components for conducting data or signal processing or for executing computer code stored in memory 1004. The processor device 1002 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processor device 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with a processor device 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program product 1020 stored on a transitory or non-transitory computer-usable or computer-readable storage medium (e.g., single medium or multiple media), such as the storage device 1014, which includes complex programming instructions (e.g., complex computer-readable program code) to cause the processor device 1002 to carry out the steps described herein. Thus, the computer-readable program code can comprise software instructions for implementing the functionality of the examples described herein when executed by the processor device 1002. The processor device 1002 may serve as a controller or control system for the computer system 1000 that is to implement the functionality described herein.

The computer system 1000 also may include an input device interface 1022 (e.g., input device interface and/or output device interface). The input device interface 1022 may be configured to receive input and selections to be communicated to the computer system 1000 when executing instructions, such as from a keyboard, mouse, touch-sensitive surface, etc. Such input devices may be connected to the processor device 1002 through the input device interface 1022 coupled to the system bus 1006 but can be connected through other interfaces such as a parallel port, an Institute of Electrical and Electronic Engineers (IEEE) 1394 serial port, a Universal Serial Bus (USB) port, an IR interface, and the like. The computer system 10100 may include an output device interface 1024 configured to forward output, such as to a display, a video display unit (e.g., a liquid crystal display (LCD) or a cathode ray tube (CRT)). The computer system 1000 may also include a communications interface 1026 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence. Thus, it should be noted that the naming of the steps not necessarily, but might according to at least one example, relate to the order in which the steps are carried out.

Example 1: A computer system comprising a processor device configured to:

determine battery current of each battery pack of a plurality of parallelly connected battery packs of an energy storage system of a vehicle, determine a system current for all of the plurality of parallelly connected battery packs in the energy storage system, compare the determined battery current with a predetermined battery pack overcurrent threshold for each one of the battery packs, and comparing the determined system current with a system overcurrent threshold, activate an overcurrent fuse of an associated battery pack in response to the determined battery current of the associated battery pack being higher than the battery pack overcurrent threshold, and to activate the overcurrent fuse of the same battery pack in response to the determined system current being higher than the system overcurrent threshold.

Example 2: A computer-implemented method, comprising:

determining, by a processor device of a computer system, battery current of each battery pack of a plurality of parallelly connected battery packs of an energy storage system of a vehicle, determining, by the processor device, a system current for all of the plurality of parallelly connected battery packs in the energy storage system, comparing, by the processor device, the determined battery current with a predetermined battery pack overcurrent threshold for each one of the battery packs, and comparing, by the processor device, the determined system current with a system overcurrent threshold, activating, by the processor device, an overcurrent fuse of an associated battery pack in response to the determined battery current of the associated battery pack being higher than the battery pack overcurrent threshold, and activating, by the processor device, the overcurrent fuse of the same battery pack in response to the determined system current being higher than the system overcurrent threshold.

Example 3: The method of example 2, further comprising:

receiving, by the processor device, measurement data from a plurality of sensors of the energy storage system, wherein the measurement data comprises battery current of each battery pack and the system current.

Example 4: The method of any of examples 2-3, further comprising:

determining, by the processor device, the plurality of parallelly connected battery packs as the battery packs of the energy storage system being connected to a common traction voltage bus of the energy storage system.

Example 5: The method of example 4, further comprising:

using, by the processor device, a determined current of the common traction voltage bus as the system current.

Example 6: The method of example 5, wherein the battery pack overcurrent threshold is independently set with regards to the current of the common traction voltage bus.

Example 7: The method of any of examples 5-6, further comprising:

determining, by the processor device, a plurality of loads electrically coupled to the common traction voltage bus, and using, by the processor device, a determined current of any one of the common traction voltage bus and the plurality of loads as the system current.

Example 8: The method of any of examples 2-7, wherein the system overcurrent threshold is at least twice the battery pack overcurrent threshold, and at most four times the battery pack overcurrent threshold.

Example 9: The method of any of examples 2-8, wherein the overcurrent fuse is a pyro-fuse or a semiconductor fuse.

Example 10: The method of any of examples 2-9, comprising activating, by the processor device, the overcurrent fuse of each one of the battery packs in response to the determined system current being higher than the system overcurrent threshold.

Example 11: An energy storage system of vehicle comprising a plurality of parallelly arranged battery packs connectable to a common traction voltage bus, and an associated overcurrent fuse for each battery pack, the overcurrent fuses being configured to protect the battery packs with regards to an overcurrent, the energy storage system further comprising a control circuitry configured to:

determine battery current of each battery pack connected to the common traction voltage bus, determine a system current for all battery packs connected to the common traction voltage bus, compare the determined battery current with a predetermined battery pack overcurrent threshold for each one of the battery packs, and compare the determined system current with a system overcurrent threshold, activate the overcurrent fuse of an associated battery pack in response to the determined battery current of the associated battery pack being higher than the battery pack overcurrent threshold, and activate the overcurrent fuse of the same battery pack in response to the determined system current being higher than the system overcurrent threshold.

Example 12: The energy storage system of example 11, further comprising:

a plurality of sensors configured to provide measurements of battery current of each battery pack and the system current.

Example 13: The energy storage system of example 12, wherein the plurality of sensors is a plurality of current shunts.

Example 14: The energy storage system of any of examples 11-13, further comprising:

a plurality of battery pack overcurrent comparators configured to compare the determined battery current with a predetermined battery pack overcurrent threshold for each one of the battery packs, and one or more system overcurrent comparators configured to compare the determined system current with a system overcurrent threshold, wherein the overcurrent fuse of each one of the battery packs is directly connected to one of the plurality of battery pack overcurrent comparators, and at least one system overcurrent comparator for corresponding activation of the overcurrent fuse.

Example 15: The energy storage system of example 14, wherein the battery pack overcurrent comparators are battery pack analogue comparators, and/or wherein the one or more system overcurrent comparators are one or more system analogue comparators.

Example 16: The energy storage system of any of examples 12-13 and any of examples 14-15, wherein the plurality of sensors, the plurality of overcurrent comparators and the one or more system overcurrent comparators are comprised in the control circuitry.

Example 17: A vehicle comprising the processor device to perform the method of any of examples 2-10, or the energy storage system of any of examples 11-16.

Example 18: A computer program product comprising program code for performing, when executed by the processor device, the method of any of examples 2-10.

Example 19: A control system comprising one or more control units configured to perform the method of any of examples 2-10.

Example 20: A non-transitory computer-readable storage medium comprising instructions, which when executed by the processor device, cause the processor device to perform the method of any of examples 2-10.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to:

determine battery current of each battery pack of a plurality of parallelly connected battery packs of an energy storage system of a vehicle, determine a system current for all of the plurality of parallelly connected battery packs in the energy storage system, compare the determined battery current with a predetermined battery pack overcurrent threshold for each one of the battery packs, and comparing the determined system current with a system overcurrent threshold, activate an overcurrent fuse of at least one of the battery packs in response to the determined battery current of such battery packs being higher than the battery pack overcurrent threshold, and to activate the overcurrent fuse of the same battery pack in response to the determined system current being higher than the system overcurrent threshold.

2. A computer-implemented method, comprising:

determining, by a processor device of a computer system, battery current of each battery pack of a plurality of parallelly connected battery packs of an energy storage system of a vehicle, determining, by the processor device, a system current for all of the plurality of parallelly connected battery packs in the energy storage system, comparing, by the processor device, the determined battery current with a predetermined battery pack overcurrent threshold for each one of the battery packs, and comparing, by the processor device, the determined system current with a system overcurrent threshold, activating, by the processor device, an overcurrent fuse of at least one of the battery packs in response to the determined battery current of such battery packs being higher than the battery pack overcurrent threshold, and activating, by the processor device, the overcurrent fuse of the same battery pack in response to the determined system current being higher than the system overcurrent threshold.

3. The method of claim 2, further comprising:

receiving, by the processor device, measurement data from a plurality of sensors of the energy storage system, wherein the measurement data comprises battery current of each battery pack and the system current.

4. The method of claim 2, further comprising:

determining, by the processor device, the plurality of parallelly connected battery packs as the battery packs of the energy storage system being connected to a common traction voltage bus of the energy storage system.

5. The method of claim 4, further comprising:

using, by the processor device, a determined current of the common traction voltage bus as the system current.

6. The method of claim 5, wherein the battery pack overcurrent threshold is independently set with regards to the current of the common traction voltage bus.

7. The method of claim 5, further comprising:

determining, by the processor device, a plurality of loads electrically coupled to the common traction voltage bus, and using, by the processor device, a determined current of any one of the common traction voltage bus and the plurality of loads as the system current.

8. The method of claim 2, wherein the system overcurrent threshold is at least twice the battery pack overcurrent threshold, and at most four times the battery pack overcurrent threshold.

9. The method of claim 2, wherein the overcurrent fuse is a pyro-fuse or a semiconductor fuse.

10. The method of claim 2, comprising activating, by the processor device, the overcurrent fuse of each one of the battery packs in response to the determined system current being higher that the system overcurrent threshold.

11. A vehicle comprising the processor device to perform the method of claim 2.

12. A computer program product comprising program code for performing, when executed by the processor device, the method of claim 2.

13. A control system comprising one or more control units configured to perform the method of claim 2.

14. A non-transitory computer-readable storage medium comprising instructions, which when executed by the processor device, cause the processor device to perform the method of claim 2.

15. An energy storage system of vehicle comprising a plurality of parallelly arranged battery packs connectable to a common traction voltage bus, and an associated overcurrent fuse for each battery pack, the overcurrent fuses being configured to protect the battery packs with regards to an overcurrent, the energy storage system further comprising a control circuitry configured to:

determine battery current of each battery pack connected to the common traction voltage bus, determine a system current for all battery packs connected to the common traction voltage bus, compare the determined battery current with a predetermined battery pack overcurrent threshold for each one of the battery packs, and compare the determined system current with a system overcurrent threshold, activate an overcurrent fuse of at least one of the battery packs in response to the determined battery current of such battery packs being higher than the battery pack overcurrent threshold, and activate the overcurrent fuse of the same battery pack in response to the determined system current being higher than the system overcurrent threshold.

16. The energy storage system of claim 15, further comprising:

a plurality of sensors configured to provide measurements of battery current of each battery pack and the system current.

17. The energy storage system of claim 16, wherein the plurality of sensors is a plurality of current shunts.

18. The energy storage system of claim 16, wherein the plurality of sensors, the plurality of overcurrent comparators and the one or more system overcurrent comparators are comprised in the control circuitry.

19. The energy storage system of claim 15, further comprising:

a plurality of battery pack overcurrent comparators configured to compare the determined battery current with a predetermined battery pack overcurrent threshold for each one of the battery packs, and one or more system overcurrent comparators configured to compare the determined system current with a system overcurrent threshold, wherein the overcurrent fuse of each one of the battery packs is directly connected to one of the plurality of battery pack overcurrent comparators, and at least one system overcurrent comparator for corresponding activation of the overcurrent fuse.

20. The energy storage system of claim 19, wherein the battery pack overcurrent comparators are battery pack analogue comparators, and/or wherein the one or more system overcurrent comparators are one or more system analogue comparators.

* * * * *